(12) United States Patent
Nevanlinna et al.

(10) Patent No.: US 10,876,071 B2
(45) Date of Patent: Dec. 29, 2020

(54) FRACTIONATION OF BIOMASS-BASED MATERIAL

(71) Applicant: Neste Oyj, Espoo (FI)

(72) Inventors: Ville Nevanlinna, Espoo (FI); Kim Vikman, Turku (FI)

(73) Assignee: NESTE OYJ, Espoo (FI)

( * ) Notice: Subject to any disclaimer, the term of this patent is extended or adjusted under 35 U.S.C. 154(b) by 0 days.

(21) Appl. No.: 16/511,237

(22) Filed: Jul. 15, 2019

(65) Prior Publication Data

US 2020/0017800 A1    Jan. 16, 2020

(30) Foreign Application Priority Data

Jul. 13, 2018 (FI) ..................................... 20180083

(51) Int. Cl.
| | | |
|---|---|---|
| *C11B 13/00* | (2006.01) | |
| *B01D 1/06* | (2006.01) | |
| *B01D 1/08* | (2006.01) | |
| *B01D 3/14* | (2006.01) | |
| *C11B 3/00* | (2006.01) | |
| *C11B 3/12* | (2006.01) | |

(52) U.S. Cl.
CPC ............ *C11B 13/005* (2013.01); *B01D 1/065* (2013.01); *B01D 1/08* (2013.01); *B01D 3/148* (2013.01); *C11B 3/001* (2013.01); *C11B 3/12* (2013.01)

(58) Field of Classification Search
CPC ......... C11B 13/005; C11B 3/12; B01D 1/065; B01D 3/148
See application file for complete search history.

(56) References Cited

U.S. PATENT DOCUMENTS

| | | | |
|---|---|---|---|
| 2,224,984 A | * | 12/1940 | Potts ........................ C11B 3/14 554/205 |
| 3,644,179 A | | 2/1972 | Knoer et al. |
| 4,076,700 A | * | 2/1978 | Harada ................. C11B 13/005 203/72 |
| 6,107,456 A | | 8/2000 | Huibers et al. |
| 2015/0052807 A1 | * | 2/2015 | Nousiainen ............ C10G 21/20 44/606 |

FOREIGN PATENT DOCUMENTS

| | | |
|---|---|---|
| EP | 0952208 A2 | 10/1999 |
| EP | 2838979 A1 | 2/2015 |
| JP | 2000-219891 A | 8/2000 |
| WO | 2008099051 A2 | 8/2008 |

(Continued)

OTHER PUBLICATIONS

Lars-Hugo Norlin, "Tall Oil," 35 Ullmann's Encyclopedia of Industrial Chemistry 583 (published online 2000).*

(Continued)

*Primary Examiner* — Nicholas E Hill
(74) *Attorney, Agent, or Firm* — Buchanan Ingersoll & Rooney PC

(57) ABSTRACT

A process is disclosed for fractionating biomass-based material. The process includes evaporating an evaporable part of biomass-based material in a short path evaporator, SPE, to produce a depitched lights fraction in liquid form, and a heavier pitch fraction. The depitched lights fraction may contain depitched tall oil in liquid form, and the heavier pitch fraction may contain tall oil pitch, TOP.

22 Claims, 2 Drawing Sheets

(56) References Cited

FOREIGN PATENT DOCUMENTS

| WO | 2012069704 A1 | 5/2012 |
| WO | 2013156683 A1 | 10/2013 |
| WO | 2014098692 A1 | 6/2014 |

OTHER PUBLICATIONS

Search Report issued in corresponding Finnish Patent Application No. 20180083, 2 pages (dated Nov. 12, 2018).
Office Action issued in corresponding Finnish Patent Application No. 20180083, 5 pages (dated Nov. 12, 2018).
Office Action issued in corresponding Finnish Patent Application No. 20180083, 4 pages (dated Apr. 8, 2019).
The extended European Search Report dated Dec. 9, 2019, by the European Patent Office in corresponding European Application No. 19185216.9. (8 pages).
Japanese Office Action dated Feb. 4, 2020, issued in corresponding application JP 2019-128013; and English translation thereof.

\* cited by examiner

FRACTIONATION OF BIOMASS-BASED MATERIAL

FIELD OF THE INVENTION

The present invention relates to fractionation of crude tall oil and/or other biomass-based material, and more particularly to depitching of crude tall oil and/or other biomass-based material.

BACKGROUND

The following background description art may include insights, discoveries, understandings or disclosures, or associations together with disclosures not known to the relevant art prior to the present invention but provided by the present disclosure. Some such contributions disclosed herein may be specifically pointed out below, whereas other such contributions encompassed by the present disclosure the invention will be apparent from their context.

In crude tall oil (CTO) fractionation, pitch is removed from crude tall oil by using thin film evaporators in series. U.S. Pat. No. 3,644,179 by Krems-Chemie discloses using Luwa thin film evaporators for dehydration, depitching, and heat exchange for boil-up in packed fractionation columns. This approach minimizes the time during which heat-sensitive compounds in tall oil were exposed to elevated temperature.

Crude tall oil and products obtained from crude tall oil are very sensitive to heat. Excessive temperature or exposure to high temperature for a long period of time causes degradation and subsequent loss of product, or at least a discoloured product. This may be counteracted by the use of very high vacuum for the distillation columns and thin film evaporators as the reboilers. The applicability of dry distillation not only is influenced by the CTO composition but is also highly dependent on conditions, for example, operating pressure and temperature and residence time of the products in the depitcher. Vaporization and squeezing of vaporizable products, such as separation of fatty acid and rosin acid from native pitch compounds in CTO and from pitch formed by heating, require a high temperature (250-320° C.), even at low pressure (800-1300 Pa), at the vapour entrance into a rosin distillation column or a first fractionation column.

SUMMARY

The following presents a simplified summary of features disclosed herein to provide a basic understanding of some exemplary aspects of the invention. This summary is not an extensive overview of the invention. It is not intended to identify key/critical elements of the invention or to delineate the scope of the invention. Its sole purpose is to present some concepts disclosed herein in a simplified form as a prelude to a more detailed description.

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

BRIEF DESCRIPTION OF THE DRAWINGS

In the following the invention will be described in greater detail by means of preferred embodiments with reference to the attached drawings, in which.

DETAILED DESCRIPTION OF EMBODIMENTS

Figure 1:
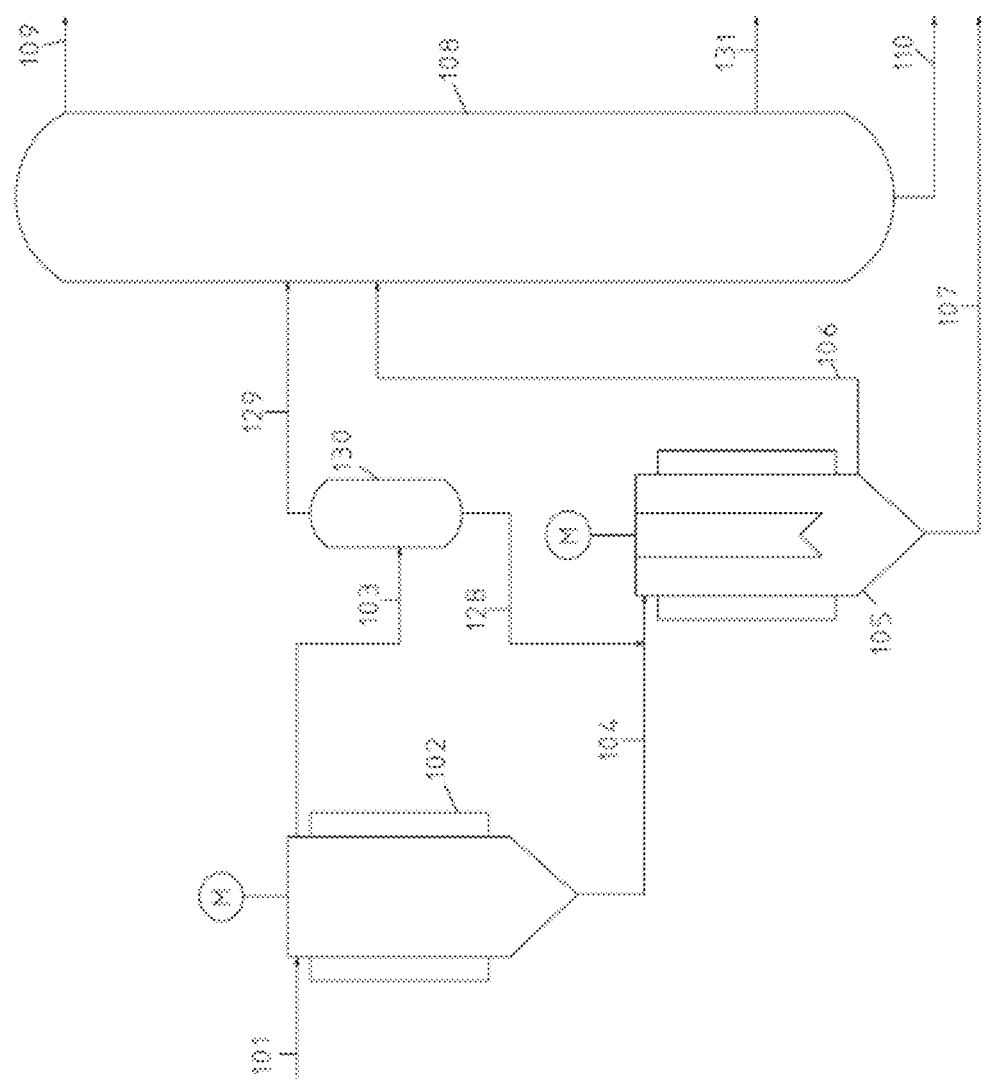
FIG. 1 illustrates exemplary depitching and distillation processes in fractionation of biomass-based material such as CTO.

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising", "containing" and "including" should be understood as not limiting the described embodiments to consist of only those features that have been mentioned and such embodiments may contain also features/structures that have not been specifically mentioned. In an embodiment, the method steps or embodiments may be performed in combination with each other. In another embodiment, only some of the method steps or embodiments may be performed.

To diminish the undesired effects of heat degradation during tall oil depitching, an improved process and apparatus are disclosed, in which a series of at least one thin film evaporator (TFE) and at least one short path evaporator (SPE) is used for the depitching. An exemplary process and apparatus enable to further decrease the exposure of the feedstocks to high temperature in depitching, thus enabling a higher yield of distillates and reduced size of the depitching evaporator compared to known solutions. An exemplary process also has an effect on the rosin distillation column diameter such that the total volume of the rosin distillation column is decreased. The achieved reduced size of the depitching evaporator and rosin distillation column enable lowering investment costs of a crude tall oil fractionation plant.

The temperatures used for the depitching are the highest of the whole CTO fractionation process. An exemplary process enables a considerable decrease in the temperatures used for the depitching; the depitching temperature may even be decreased by 20° C. or more.

An exemplary process also enables decreasing the pressure loss in the top part of the rosin distillation column due to partly liquefied feed. This gives an additional design parameter for optimization of rosin distillation column pressure profile. Finally, lower overall pressure drop in the rosin distillation column may be achieved, thus enabling higher yields of the rosin product, without increasing the bottom temperature in the rosin distillation column.

Crude tall oil comprises water, turpentine, light neutrals (e.g. unsaponifiables such as alcohols, light esters, ketones), fatty acid, rosin acid, heavy neutrals (e.g. esters, dimers, anhydrides, and/or alcohols such as sterols), salts, and solid material. The solid material is mainly lignin-derived solid material. The constituents are derived from black liquor which is a by-product from pulping of softwood (such as pine) or hardwood (such as birch). The constituents such as turpentine and/or rosin acid may also be derivable from trees by resin extraction which is a method for harvesting resin. Side reactions in CTO fractionation are limited by kinetics, and they may be reduced by reducing temperature and residence time. In addition to the reduction of the reaction rate, lower pressure also enhances separation of tall oil rosin from heavier neutral components. The composition of crude tall oil may depend on its origin, and the amounts (wt-%) of the constituents of crude tall oil may vary depending on the origin of the crude tall oil.

It should be noted that instead of or in addition to crude tall oil, any other biomass-based lipid material or lipid material originating from biological material, such as biological material originating from plants or animals or their waste products, such as sludge palm oil (SPO), used cooking oil (UCO), and/or animal fat (AF), may also be used as the raw material in the fractionation and/or depitching process. Basically, biomass-based material refers to any material produced by the growth of micro-organisms, plant and/or animals.

In an embodiment, a process for fractionating biomass-based material may comprise evaporating an evaporable part of biomass-based material in a short path evaporator, SPE, to produce a depitched lights fraction in liquid form, and a heavier pitch fraction.

In an embodiment, CTO is used as the raw material, wherein the depitched lights fraction may contain depitched tall oil in liquid form, and the heavier pitch fraction may contain tall oil pitch, TOP. However, instead of or in addition to CTO, other biomass-based and/or biological material may be used as the raw material, such as sludge palm oil (SPO), used cooking oil (UCO), and/or animal fat (AF).

FIG. 1 illustrates an exemplary process for depitching and distillation of crude tall oil. In crude tall oil fractionation, depitching is performed downstream of dehydration. In an embodiment, depitching is performed to remove pitch from dehydrated crude tall oil 101 by using a thin film evaporator (TFE) 102 and a short path evaporator (SPE) 105 in series. Overhead vapour 103 obtained in the depitching from TFE 102, consists mainly of rosin acid and fatty acid but also of nonacidic compounds. The non-acidic compounds in the overhead vapour 103 may be residual non-acidic compounds such as turpentine and water remaining in the feed 101 after dehydration. The overhead vapour 103 also comprises droplets of entrained liquid which may then cause colour problems for fatty acid distillate or rosin acid products from the rosin distillation column 108. A phase separator 130 may thus be provided to remove liquid from the gas stream 103 obtained from TFE 102, and the removed liquid 128 may be returned back to the depitching phase (i.e. to SPE 105 or TFE 102) or recovered as product. The phase separated overhead vapour 129 from TFE 102 is fed after phase separation 130 to a rosin distillation column 108 to recover tall oil rosin (TOR) as a bottom fraction 110 (liquid), or as side draw 131 (gaseous or liquid), from the lower part of the distillation column 108.

In an embodiment, the TOP fraction 107 is recovered at an SPE bottoms temperature of 240° C. to 320° C., preferably 260° C. to 300° C., more preferably 270° C. to 290° C.

In an embodiment, the feed temperature of the phase-separated overhead vapour 129 to the rosin distillation column 108 is 180° C. to 240° C., preferably about 220° C. to 230° C., and only a single TFE is used in evaporation of the dehydrated CTO 101 in order to obtain the overhead vapour 103. TFE bottom fraction 104 (i.e. dehydrated CTO fraction from which overhead vapour 103 has been removed by evaporation in TFE) comprising TFE residue is fed to SPE 105. SPE 105 is operated at a pressure lower than that of TFE 102. The liquid 128 removed from the TFE overhead vapour 103 by phase separation 130, is also fed to SPE 105. In SPE 105, remaining fatty acid and rosin acid are evaporated from the TFE bottom fraction 104 and from the liquid 128.

SPE differs from TFE design in that SPE has a condenser located inside the SPE body. SPE is operable at a lower operating pressure (such as 300 Pa to 1000 Pa) compared to TFE. The lower operating pressure of SPE also enables a lower operating temperature. SPE may be operated at different (i.e. lower) pressure because the SPE distillate 106 is condensed and may be pumped to a downstream equipment (i.e. the rosin distillation column 108). The SPE distillate (i.e. SPE liquid) 106 contains depitched tall oil. The rosin distillation column 108 has two feeds: phase separated overhead vapour 129 from phase separation 130 at distillation column feed section pressure, and SPE liquid feed 106 from SPE 105 with a pump or by gravity depending on the plant layout. The SPE liquid feed 106 from SPE 105 and/or the phase separated overhead vapour 129 to the rosin distillation column 108 may be fed at one or more (different) heights of the rosin distillation column 108. This allows a designer to more flexibly match the feed with the composition profile of the column 108. This minimizes the mixing losses encountered at the feed section. In turn, this lowers the energy consumption by reducing reboiling duty. As a result of evaporation in SPE 105, a fraction comprising tall oil pitch (TOP) 107 is obtained as liquid residue. The depitched tall oil in liquid form 106 may be obtained as SPE liquid distillate 106. The obtained tall oil pitch 107 may be directed to further processing (not shown in FIG. 1).

In existing solutions, TFE has the highest temperatures (over 300° C.) in the entire crude tall oil refining process. In an embodiment, SPE 105 may be operated at rosin distillation column top part pressure (typically 400 Pa, or less), while TFE operating pressure is rosin distillation column pressure (typically 400 Pa, or less, +the pressure drop of the rosin distillation column section above, typically 1000 Pa pressure drop, or less, with structured packing column). TFE operating pressure is thus about 1400 Pa. The pressure decrease results in a temperature decrease of 15 to 30° C. SPE allows the use of a very low operating pressure, because in SPE structure there is no vapour line between the evaporator surface and the condenser. SPE may in practice be operated at a pressure of 1 Pa, or above, also in an industrial scale CTO fractionation system. SPE may be operated at a pressure of 1400 Pa or less, preferably at 100 Pa to 1000 Pa, more preferably at 200 Pa to 700 Pa, yet more preferably at 250 Pa to 400 Pa. In an embodiment, SPE is operated at a distillation column top part pressure, e.g. at 100 Pa to 1000 Pa, typically at about 400 Pa or less. Operation below distillation column top part pressure requires a separate vacuum system for SPE, for example, in case the CTO fractionation plant is expected to have high extent of undesired reactions.

Thus there are two different kinds of evaporator units 102, 105, and further, there are two different kinds of streams (liquid 106 and vapour 129 (or 103 if there is no phase separation 130)) that are fed from the evaporators 102, 105 to the distillation column 108. The CTO fraction 104 comprising TFE residue is subjected to the evaporating in SPE 105 directly after the evaporation in TFE 102, and the fraction 106 is subjected to the distillation in the distillation column 108 directly after the evaporation in SPE 105.

Rosin distillation is performed in the distillation column 108. Before fractionation in the distillation column 108, the overhead vapour 103 from TFE 102 may be subjected to the phase separation in a phase separator 130 to remove entrained liquid. The distillation column 108 may be a packed column, such as a random packing column, structured packing column or tray column. Overhead vapour 103, 129 from TFE 102 and liquid feed (i.e. depitched tall oil)

106 from SPE 105 are fed to the rosin distillation column 108 to recover tall oil rosin 110, 131 as a bottom fraction 110 in liquid phase, or as side draw 131 in liquid or vapour phase, depending on the quality specification of the rosin product 110, 131 and CTO quality. The distillate (side stream 109 from the upper part of the distillation column 108) is a crude fatty acid (CFA) intermediate fraction 109 which may further contain about 3 wt-% to 8 wt-% rosin acid, preferably about 5 wt-% rosin acid.

Due to the lower depitching temperature and heat duty, the depitcher requires a significantly smaller heat exchanging area. The heat exchanging area of rosin distillation column 108 reboiler may increase. As the quality of the feed to the distillation column 108 changes to include more saturated liquid, the lower gas load in the top part of the column is reduced. Therefore, the diameter of the rectifying section of the rosin distillation column 108 and the total volume of the rosin distillation column 108 decrease. This means less packing and less material costs for the distillation column 108.

It should be noted that the phase separation 130 is optional, and it is also possible to feed the TFE overhead vapour 103 from TFE 102 without phase separation to the rosin distillation column 108.

An embodiment improves the depitcher part of the crude tall oil fractionation process. Instead of TFEs in series, two different kinds of evaporators, TFE 102 and SPE 105 in series are used in the depitching.

Thus, in an embodiment, the depitcher part comprises at least one TFE 102 followed by at least one SPE 105 in series with TFE 102.

In another embodiment, the depitcher part of the crude tall oil fractionation process comprises two or more TFEs and/or SPEs in series and/or in parallel.

Figure 2:
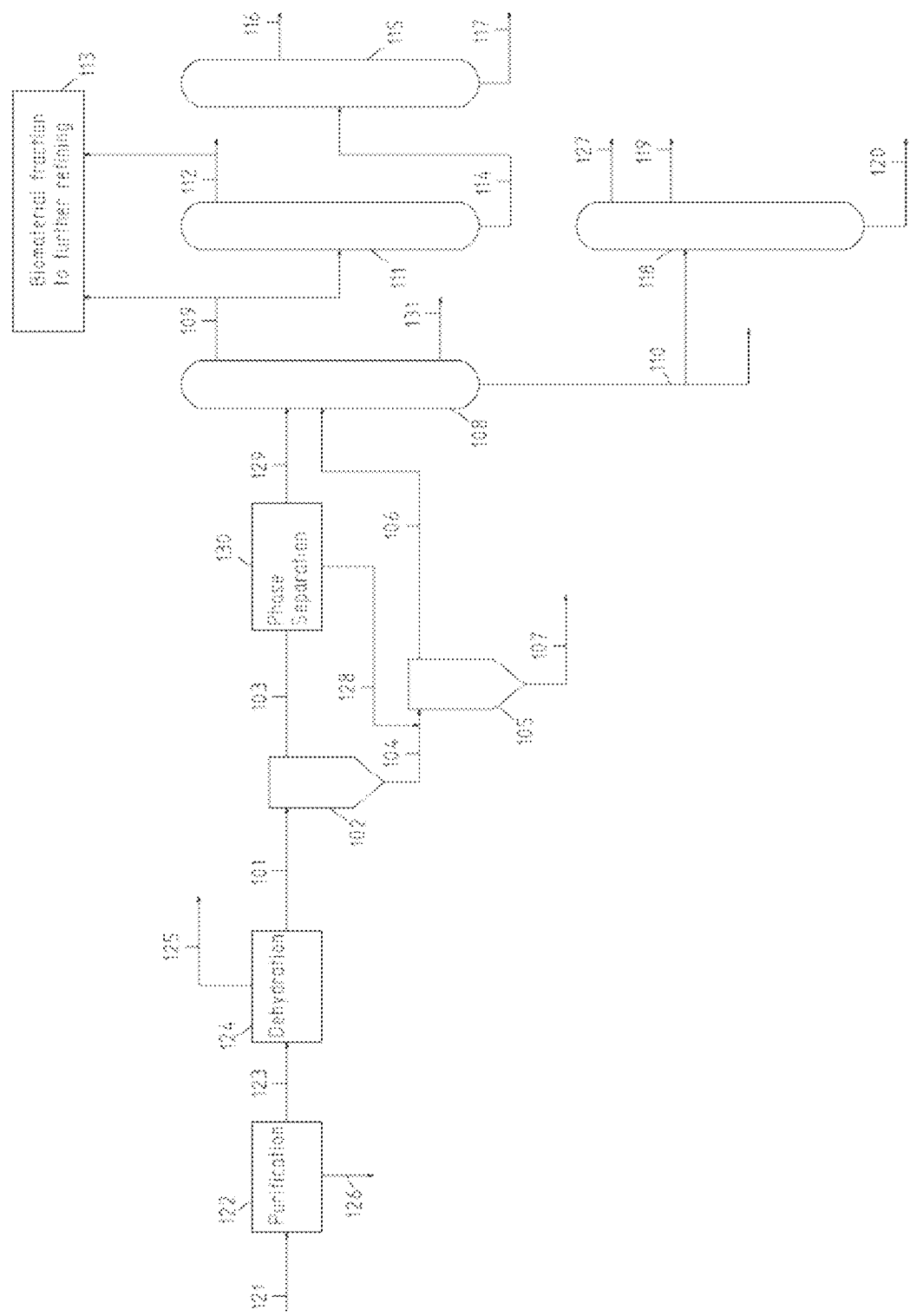
FIG. 2 illustrates an exemplary process for fractionation of biomass-based material such as CTO.

FIG. 2 illustrates an exemplary process for fractionation of crude tall oil. The processing sequence for the fractionation of crude tall oil may include the following fractionation phases: purification, dehydration, depitching, rosin/fatty acid separation (i.e. rosin distillation), rosin redistillation, heads separation, and/or TOFA separation. An apparatus is disclosed to subject crude tall oil to said phases.

In an embodiment, a process and apparatus are provided to subject crude tall oil (CTO) 121 to a purification step 122, and separation of turpentine and water 125 by dehydration 124, for the production of dehydrated crude tall oil 101.

In purification 122, CTO is contacted with water, wherein the amount of water used is less than about 5% of the weight of the incoming CTO. The water used for the purification 122 may contain additives. The contact between CTO and the water may be performed by mixing (e.g. for 15 min) in a dynamic mixer or any other equipment that is able to provide an intimate contact between CTO and the water. The water removes some of the CTO impurities (inorganic salts and residual acid ($H_2SO_4$)) 126, whereas water additive removes other impurities 126 such as transition metals and alkaline earth metals as well as various soaps. The purification 122 may be performed at an elevated temperature to improve viscosity and salt solubility. For example, a temperature higher than 90° C., preferably about 95° C. may be used. A chelating agent such as oxalic acid, citric acid, sulphuric acid, phosphoric acid, and/or ethylene-di-amine tetra-acetic (EDTA) acid or other organic weak acid may be used as an additive in the water. Centrifugation, settling and/or decantation of the mixture may be performed in step 122 to extract the impurities 126 and to produce purified crude tall oil 123. The purified crude tall oil 123 is subsequently subjected to dehydration in step 124 to remove water and volatiles such as turpentine 125. The dehydration may be performed e.g. by thin film evaporation in moderate vacuum (3-10 kPa) and at a temperature of 50-240° C.

However, it should be noted that the purification is an optional step, and may thus be omitted. It is also possible to perform the purification or removal of impurities in a later stage, e.g. for the process stream 107 (tall oil pitch) and/or for the crude fatty acid 109, stabilized crude fatty acid 114 or TOFA 116 if the further purified product is distilled at the plant, instead of or in addition to step 122. Streams 101, 110, 117, 120, 109, 112, 116, 119, 131 and 127 may be purified together with the above mentioned streams or some other combination depending on the tall oil distillation plant product and feed portfolio. If the purification is performed in a later stage, e.g. for the process stream 107 and/or 109, a more economical salt removal or purification is achievable. The process streams 107, 109 are smaller compared to the process stream 121; therefore a smaller amount of stream needs to be purified, if the desalting, purification or removal of impurities is performed in the later stage, e.g. for the process stream 101, 107, 109, 110, 112, 117, 120, 112, 116, 119, 127 and 131 or any combination of the above mentioned streams. This gives a possibility to purify each stream in the most effective and economical way in terms of investment costs, operations costs and impurity purification efficiency.

In an embodiment, stream 101, 107, 109, 110, 112, 117, 120, 131, or any combination thereof, is purified to achieve an improved quality of the stream(s), so that it may be used as fuel, intermediate chemical for other chemicals, feedstock for renewable fuels production or biochemical manufacturing. The requirements of downstream processes or end uses vary a lot and the methods of purification comprise filtration (normal and/or deep filtration with filter aid), centrifugal separation, decantation, mixing with plain water or water including an additive such as oxalic acid, citric acid, sulphuric acid, phosphoric acid and/or ethylene-di-amine tetra-acetic (EDTA) acid or other organic weak acid, and followed or preceded by any combination of the above mentioned steps (water or water with an additive may be added from 0.05 wt-% (500 ppm) to 25 wt-% of treated stream), treatment with water, acid treatment, degumming or bleaching, purification in a catalytic bed containing a molecular sieve, absorbent or adsorbent, deodorization, redistillation, extraction, winterization, dewaxing, and/or heat treatment at 200-300° C. with or without added water followed by any combination of the above mentioned purification steps.

The above mentioned purification methods or combinations thereof are used to prevent a harmful effect of the stream where the impurities act as catalyst poison or prevent the functioning of the downstream process some other way such as fouling, corrosion, etc. The processes where the purified material may be used are, for example, catalytic processes such as hydrotreatment, hydrocracking, isomerization, hydrodeoxygenation, catalytic isomerization, fluid catalytic cracking, thermocatalytic cracking, catalytic dehydration, catalytic ketonization, or catalytic esterification. Other uses may include energy production in a boiler or furnace, bulk chemical production, asphalt additive, sitosterol recovery, polymers, solvents, and/or emulsification agent.

The removed impurities or contaminants comprise metals, salts, other inorganic components, sulphur compounds, ash, or lignin.

The operation temperature of the above mentioned purification methods may be from 70° C. to 300° C. For the streams containing TOP or majority of TOP stream 107, temperatures are preferably at least 100° C. or higher.

The same purification methods may be used for purification of the streams 109, 112, 116 and 127 which contain more fatty acid, rosin acid and light neutral components. These streams are lighter and contain less impurities than the streams with heavy neutral components (pitch components) so lower temperatures (around 100° C.) are typically sufficient. The most preferred methods for impurity removal for these streams are treatment with water, acid treatment, degumming or bleaching prior feeding to a downstream process such as hydrotreatment, hydrocracking, isomerization, hydrodeoxygenation, catalytic isomerization, fluid catalytic cracking, thermocatalytic cracking, catalytic dehydration, catalytic ketonization, or catalytic esterification. Purification in a catalytic bed containing a molecular sieve, absorbent or adsorbent may also be a preferred method.

The turpentine fraction 125 comprises organic compounds such as terpenes, and typically boils in the range of 120-180° C. at atmospheric pressure. The produced dehydrated crude tall oil 101 is subsequently treated in the thin-film evaporator (TFE) 102 followed by phase separation 130 for the TFE overhead vapour 103, and SPE 105 in series, for removal of tall oil pitch (TOP) 107, as described above in connection with FIG. 1. Items/steps/process streams 101 to 110 and 128 to 131 presented in FIG. 2 correspond to those presented above in connection with FIG. 1 (depitching+rosin distillation), and therefore need not be repeated herein.

The distillate 109 obtained from the distillation column 108 as described above in connection with FIG. 1, is recovered and (at least partly) fed to a light ends distillation column 111 to remove light heads 112 as the distillate. The light heads fraction 112 obtained from the light ends distillation column 111, and optionally at least part of the crude fatty acid fraction 109 obtained as the distillate from the rosin distillation column 108, may be fed as a biomaterial fraction 113 to further refining to produce renewable fuels or to manufacture biochemicals.

A further distilled/purified crude fatty acid fraction 114 is obtained as the bottom fraction of the light ends distillation column 111. The crude fatty acid fraction 114 obtained from the light ends distillation column 111, is subsequently fed to a fatty acid distillation column (i.e. TOFA column 115) for fractionation, where tall oil fatty acid (TOFA) 116 is obtained as the distillate, and bottom oil 117 is obtained as the bottom fraction of the TOFA column 115.

Thus, the refining of fatty acid containing distillate 109 from the rosin distillation column 108 is typically refined in the heads column 111 and TOFA column 115. The operating pressure may be the same or slightly higher in the heads column 111 and in the TOFA column 115 compared to the rosin distillation column 108, because bottom fractions of columns 111 and 115 contain less heavy neutral components than column 108 bottoms.

At least part of the bottom fraction 110 obtained from the rosin distillation column 108, may optionally be fed to a rosin redistillation column 118 to perform redistillation/purification of tall oil rosin 110, wherein a distillate containing purified tall oil rosin (TOR) 119 is obtained. Bottoms rosin 120 is obtained as the bottom fraction 120 from the rosin redistillation column 118. The redistillation column 118 enables improving the quality of tall oil rosin (TOR) acid. It enables the production of a TOR cut (i.e. the tall oil rosin 119) having 95-96% free tall oil rosin (TOR) acid. Operating pressure at the redistillation column 118 may be close to that of the rosin distillation column 108. The required operating pressure in the redistillation column 118 may even be 100 Pa to 300 Pa lower than in the rosin distillation column 108, depending on the amount of heavy neutral components conveyed from depitching of CTO and the number of separation stages required in the rosin redistillation column 118. The bottom temperature of the rosin redistillation is between the depitching temperature and the rosin distillation column bottom temperature. The fractionation/distillation columns 108, 111, 115, 118 may be equipped with a reflux arrangement near the column top end, wherein a suitable reflux ratio may be selected.

The recovered stream comprising the desired components may be discharged from a "draw tray" installed below a top packing, or from a "draw tray" installed below an intermediate packing, of the fractionation/distillation column 108, 111, 115, 118.

An embodiment enables decreasing the maximum operating temperature of the CTO fractionation plant at critical locations. This gives the possibility to reduce the overall cost of the heating system that provides energy for the evaporation and reboiling at the CTO fractionation plant.

An embodiment enables efficient heat recovery at high temperature, wherein dehydration 124 steps may be heated with residue heat.

Heat may be recovered from pumparounds and SPE to produce steam for the ejector system. The ejector system is the most typical way of generating vacuum for the CTO fractionation plant. An embodiment may utilize direct contact condensing in the top sections of the distillation columns. The efficient heat recovery makes the system self-sufficient in terms of steam required within the CTO fractionation plant. The heat recovery also decreases the requirement for high temperature level heating medium (hot oil or high pressure steam).

In an embodiment, the rosin distillation column 108 and/or the redistillation column 118 include a total draw off tray, a feed distributor, a collector gravity distributor, and/or a recollector, to enhance components separation.

In an embodiment, stripping steam is utilized in SPE 105 to enhance evaporation and decrease the temperature in tall oil depitching.

In an embodiment, the SPE liquid 106 is fed to the distillation column 108 at a column height different from that of the gaseous feed 103, 129. The SPE liquid is heavier than the gaseous feed 103, 129; therefore the SPE liquid 106 may be fed at lower height (lower part) to the distillation column 108 compared to the gaseous feed 103, 129.

In an embodiment, at least one of the fractions 103, 106 and 129 may be fed to the distillation column 108 at one or more different heights of the distillation column 108.

In an embodiment, a crude tall oil fractionation apparatus comprises a thin film evaporator, TFE 102, to evaporate dehydrated crude tall oil, CTO 101, to produce a TFE overhead vapour fraction 103 containing at least rosin acid and fatty acid, and a TFE residue fraction 104, and a short path evaporator, SPE 105, to evaporate the TFE residue fraction 104 to produce a depitched tall oil fraction 106 comprising depitched tall oil in liquid form, and a tall oil pitch fraction 107 comprising tall oil pitch, TOP. The apparatus further comprises a distillation column 108 to distillate the phase separated overhead vapour fraction 129 and depitched tall oil fraction 106 to produce a crude fatty acid fraction 109 comprising crude fatty acid, a tall oil rosin fraction 110, 131 comprising tall oil rosin, TOR, in liquid form, and a tall oil rosin fraction 131 comprising tall oil rosin, TOR, in gaseous form. The apparatus further comprises means for recovering said TOP fraction 107, CFA fraction 109 and TOR fractions 110, 131.

In another embodiment, the process for crude tall oil fractionation comprises performing evaporation of a CTO fraction in SPE, to produce a depitched tall oil fraction in liquid form, and a tall oil pitch fraction, wherein other process steps as described above are optional and may be omitted.

In an embodiment, the process depicted in FIG. 1 may be utilized for depitching and distillation of biomass-based material. In an embodiment, the process depicted in FIG. 2 may be utilized for fractionation of biomass-based material. Thus, UCO, SPO, AF, CTO, and/or any other biomass-based material may be used as the raw material/feedstock in FIG. 1 and/or FIG. 2.

Thus, in an embodiment, the process comprises evaporating an evaporable part of biomass-based material in a short path evaporator, SPE, 105 to produce a depitched lights fraction 106 in liquid form, and a heavier pitch fraction.

In an embodiment, the process comprises evaporating dehydrated biomass-based material in a thin film evaporator, TFE, 102 to produce a TFE overhead vapour fraction 103 containing at least organic acids and neutral organic components, and a TFE residue fraction 104, wherein said depitched lights fraction 106 in liquid form, and said heavier pitch fraction 107 are obtained by evaporating said TFE residue fraction 104 in said SPE 105. The TFE overhead vapour fraction 103 and depitched lights fraction 106 are distilled in a distillation column 108 to produce a lighter organic acid and neutral organic components fraction 109, a first heavier organic acid and neutral organic components fraction 110, 131 in liquid form, and a second heavier organic acid and neutral organic components fraction 131 in gaseous form, and the process comprises obtaining as products said heavier pitch fraction 107, lighter organic acid and neutral organic components fraction 109, first heavier organic acid and neutral organic components fraction 110, 131, and second heavier organic acid and neutral organic components fraction 131.

In an embodiment, the depitched lights fraction 106 in liquid form comprises a depitched tall oil fraction in liquid form, and the heavier pitch fraction 107 comprises a tall oil pitch, TOP, fraction, and the process comprises evaporating dehydrated crude tall oil 101 in a thin film evaporator, TFE 102, to produce a TFE overhead vapour fraction 103 containing at least rosin acid and fatty acid, and a crude tall oil, CTO, fraction 104 comprising TFE residue, wherein said depitched tall oil fraction 106 in liquid form, and said TOP fraction 107 are obtained by evaporating said CTO fraction 104 in said SPE 105. The TFE overhead vapour fraction 103 and the depitched tall oil fraction 106 are distilled in a distillation column 108 to produce a crude fatty acid fraction, CFA 109, tall oil rosin fraction, TOR 110, 131, in liquid form, and a tall oil rosin fraction, TOR 131, in gaseous form, and the process comprises obtaining as products said TOP fraction 107, CFA fraction 109 and TOR fractions 110, 131.

In an embodiment, the TFE overhead vapour fraction 103 is subjected to phase separation 130 before the distillation in the distillation column 108, to remove liquid from the TFE overhead vapour fraction 103.

In an embodiment, the depitched lights fraction 106 is subjected to distilling in the distillation column 108 directly after the evaporation in SPE 105.

In an embodiment, the lighter organic acid and neutral organic components fraction 109 (which may comprise e.g. CFA) further comprises about 3 wt-% to 8 wt-% rosin acid, preferably about 5 wt-% rosin acid.

In an embodiment, the heavier pitch fraction 107 (which may comprise e.g. TOP) is recovered at an SPE bottoms temperature of 240° C. to 320° C., preferably 260° C. to 300° C., more preferably 270° C. to 290° C.

In an embodiment, the distillation column 108 is a packed column, such as a random packing column, structured packing column or tray column.

In an embodiment, the evaporating in SPE 105 is performed at a pressure of 1400 Pa or less, preferably at 100 Pa to 1000 Pa, more preferably at 200 Pa to 700 Pa, yet more preferably at 250 Pa to 400 Pa.

In an embodiment, the process further comprises dehydrating 124 biomass-based material 121 to remove water, light organic acids, light neutral organic components and evaporable organic and inorganic impurities such as light sulphur compounds 125, to produce the dehydrated biomass-based material 101, and/or dehydrating 124 CTO 121 to remove turpentine 125 and water 125, to produce the dehydrated crude tall oil 101, wherein the dehydration 124 is performed by evaporating at a temperature of 50-240° C. and at a pressure of 3-10 kPa.

In an embodiment, the process further comprises redistilling, in a redistillation column, the first heavier organic acid and neutral organic components fraction and/or the TOR fraction in liquid form, to produce a further purified fraction 119 and a bottoms rosin fraction 120, wherein the redistillation 118 is performed below a depitching temperature, and at the pressure of the rosin distillation column 108 or lower.

In an embodiment, the process further comprises distilling, in a light heads column 111, at least part of the CFA fraction 109 and/or lighter organic acid and neutral organic components fraction 109, to produce a light heads fraction 112 as a heads column distillate, and a further CFA fraction 114 and/or a further lighter organic acid and neutral organic components fraction 114 as a heads column bottom fraction, distilling, in a fatty acid column 115, said further fraction 114 to produce a fatty acid fraction 116 obtained as a fatty acid column distillate, and bottom oil 117 obtained as a fatty acid column bottom fraction, and recovering the light heads fraction 112, the fatty acid fraction 116, and bottom oil 117, wherein the operating pressure of the light heads column 111 is close to the distillation column 108 operating pressure and fatty acid column 115 operating pressure.

In an embodiment, a fractionation apparatus comprises a thin film evaporator, TFE 102, configured to evaporate biomass-based material, such as dehydrated crude tall oil 101, to produce a TFE overhead vapour fraction 103 containing at least rosin acid and fatty acid, and a TFE residue fraction 104, a short path evaporator, SPE 105, configured to evaporate the TFE residue fraction 104 to produce a depitched lights fraction 106 in liquid form, and a heavier pitch fraction 107, a distillation column 108 configured to distillate the produced TFE overhead vapour fraction 103 and the depitched lights fraction 106 to produce a crude fatty acid fraction 109, a first rosin fraction 110, 131 in liquid form, and a second rosin fraction 131 in gaseous form, and means for recovering said fractions 107, 109, 110, 131.

In an embodiment, the TFE 102 is a wiped film evaporator or a falling film evaporator.

In an embodiment, at least one short path evaporator, SPE, 105 is used in series or in parallel with at least one thin film evaporator, TFE, 102 for depitching biomass-based material, such as dehydrated crude tall oil 101, wherein SPE 105 is located after TFE 102.

In an embodiment, the process comprises dehydrating 124 biomass-based material 121 to remove water, light organic acids, light neutral organic components and evaporable organic and inorganic impurities such as light sulphur compounds 125, to produce the dehydrated biomass-based material 101, and/or dehydrating 124 CTO 121 to remove turpentine 125 and water 125, to produce dehydrated crude tall oil 101, evaporating the dehydrated crude tall oil 101 in a thin film evaporator, TFE, 102 to produce a TFE overhead vapour fraction 103 containing at least rosin acid and fatty acid, and a CTO fraction 104 comprising TFE residue, evaporating the produced CTO fraction 104 in a short path evaporator, SPE, 105 to produce a depitched tall oil fraction 106 comprising depitched tall oil in liquid form, and a tall oil pitch, TOP, fraction 107, distilling the produced TFE overhead vapour fraction 103 and depitched tall oil fraction 106 in a distillation column 108 to produce a crude fatty acid fraction, CFA, 109 comprising crude fatty acid, a fraction comprising tall oil rosin, TOR, 110, 131 in liquid form, and a fraction comprising tall oil rosin, TOR, 131 in gaseous form, recovering said TOP fraction 107, CFA fraction 109 and TOR fractions 110, 131, redistilling, in a redistillation column 118, the TOR fraction 110 comprising tall oil rosin, TOR, in liquid form, to produce a further purified TOR fraction 119 and a bottoms rosin fraction 120, distilling, in a light heads column 111, at least part of the CFA fraction 109 comprising crude fatty acid, to produce a light heads fraction 112 as a heads column distillate, and a further crude fatty acid fraction 114 as a heads column bottom fraction, distilling, in a fatty acid column 115, the further crude fatty acid fraction 114 to produce tall oil fatty acid fraction 116 obtained as a fatty acid column distillate, and bottom oil 117 obtained as a fatty acid column bottom fraction, and recovering the light heads fraction 112, tall oil fatty acid fraction 116, and bottom oil 117.

In an embodiment, the operating pressure of the light heads column 111 is close to the distillation column 108 operating pressure and fatty acid column 115 operating pressure, the dehydration 124 is performed by evaporating at a temperature of 50-240° C. and at a pressure of 3-10 kPa, and/or the redistillation is performed below a depitching temperature, and at the pressure of the rosin distillation column 108 or lower.

In an embodiment, the process further comprises treatment of at least one of biomass-based material 121, crude tall oil 121, the TOP fraction 107, the lighter organic acid and neutral organic components fraction 109, the heavier pitch fraction 107, and the CFA fraction 109 by purification 122 to remove impurities 126.

In an embodiment, the process further comprises subjecting the TFE overhead vapour fraction 103 to phase separation 130 before the distilling in the distillation column 108, to remove liquid from the TFE overhead vapour fraction 103.

An embodiment enables minimizing the amount of heavier pitch fraction/TOP produced in the biomass-based material and/or CTO fractionation, and obtaining a high yield of raw material for the production of valuable chemicals and renewable fuels.

An exemplary embodiment enables a process where less waste water for treatment with water is produced, less solid waste is produced for filter aid filtration, less heating and cooling utilities are required, easier filtration of certain streams may be achieved, and lower impurity levels of certain streams may be achieved.

An exemplary process enables lower investment costs of a CTO fractionation plant while a better yield of tall oil resin is achievable. It is estimated that milder operating conditions result in an increase in the yield of tall oil rosin (TOR) by 2% (4.5 EUR margin increase/t of CTO feed) by reducing the reaction conversion and by a more favourable vapour-liquid equilibrium.

In the crude tall oil (CTO) fractionation, pitch is removed from dehydrated crude tall oil by using TFE(s) and SPE(s) in series, where CTO typically comprises of 20 to 40 wt-% rosin acid, 35 to 60 wt-% fatty acid and 5 to 30 wt-% neutral components such as unsaponifiables, terpenes and water.

Example 1: Thin Film Evaporator Depitching Vs. Short Path Evaporator Depitching, Rosin and Fatty Acid Losses to the Pitch Example 1 highlights the differences in CTO depitching with two TFEs in series and an embodiment described in FIG. 1. Studies were conducted on these depitching alternatives. The thin film evaporators were modelled as flash stages. In the short path evaporator model, a condensing stage was added after the flash stages.

The feed to the depitching consisted of dehydrated crude tall oil with 31 wt-% free rosin acid, 45 wt-% free fatty acid and 24 wt-% neutral components such as unsaponifiables, oxidized rosin and esters.

When using two TFEs in series (i.e. the $2^{nd}$ depitching evaporator is TFE), the final temperature of the last TFE is the limiting factor, which is typically 250-320° C. The general concern is that too high temperatures increase degradation reactions and affect the final product quality, e.g. darken the rosin product. In this study, the temperature was set to 300° C. Pressure in the depitching evaporators depends on the pressure drops in the rosin distillation column and the feed line from depitching to the rosin distillation column.

By changing the $2^{nd}$ TFE to SPE in accordance with FIG. 2, a considerably lower pressure could be used, because the condensing section minimized the gas stream which is directed e.g. to the top part of the rosin distillation column or to a separate vacuum system. In this example, SPE operated at a pressure of 3 mbar (300 Pa).

Table 1 shows the difference between SPE and TFE depitching. Two operating points for the TFE+TFE alternative were studied, at 280° C. and 300° C. The TFE+SPE alternative (i.e. the $2^{nd}$ depitching evaporator is SPE) was studied at 280° C. As can be seen from Table 1, utilizing SPE as the $2^{nd}$ depitching evaporator resulted in a considerably better recovery of the tall oil rosin and fatty acid from the tall oil pitch even at a difference of 20° C. at the bottom outlet. In practice, this transfers to better yields for fatty acid and rosin acid. Also, the heating duty is reduced due to improved vapour-liquid equilibria. The condensing duty can be utilized to e.g. low pressure steam generation.

It can also be concluded that if the two alternatives were operated at the same temperature, rosin acid losses to the pitch would become uneconomical. Therefore, it is clear that SPE as the last depitching equipment is beneficial compared to the typical solution with TFE as the 2nd depitching equipment.

TABLE 1

Comparison of thin film evaporation and short path evaporation as the $2^{nd}$ depitching evaporator

| Compared unit | 2nd depitching evaporator | | |
|---|---|---|---|
| | Thin film evaporator | Thin film evaporator | Short path evaporator |
| Heat duty (kW) | 869 | 762 | 696 |
| Condensing duty (kW) | — | — | 999 |
| Pitch exit temperature (° C.) | 300 | 280 | 280 |
| Pressure (mbar) | 15 | 15 | 3 |
| Free rosin acids in pitch wt-% | 8.3% | 17.7% | 3.2% |
| Free fatty adds in pitch wt-% | 2.0% | 4.3% | 0.8% |
| Neutral components in pitch wt-% | 89.7% | 78.0% | 96.1% |

Example 2: Thin Film Evaporator Depitching Vs. Short Path Evaporator Depitching, Degradation Reactions Tall oil fatty acid and rosin acid are known to decompose in distillation. The degradation reactions are temperature-time dependent. Commonly known in the industry there is a simple principle to estimate the rate of degradation: above 260° C., the degree of decomposition doubles for every 5° C. rise in temperature.

In Example 2, an esterification reaction between fatty acid and sterols was studied in more detail in the $2^{nd}$ depitching evaporator. However, the purpose was by no means to present a detailed kinetic model for the reactions, but rather to illustrate the potential of a lower depitching temperature in the $2^{nd}$ depitching evaporator. The bottom temperature considered was 300° C. in TFE, and 280° C. in SPE.

Kinetic data for esterification of linoleic acid with sterols were used to approximate the esterification reactions between all fatty acids (Tolvanen, P. et al., 2014, Esterification of Fatty Acids and Short-Chain Carboxylic Acids with Stearyl Alcohol and Sterols, ACS Sustainable Chemical Engineering, Volume 2, pp. 537-545). The results from the esterification estimation are presented in Table 2. As can be seen, SPE as the $2^{nd}$ depitching evaporator effectively mitigated possible reactions. It should also be noted that esterification between fatty acid and sterols is not the only degradation reaction encountered in tall oil refining. Other reactions, e.g. decarboxylation, dimerization and esterification of rosin acid, take also place at elevated temperatures. As shown in Table 2, a lower percentage of esterified fatty acid corresponds to a lower reaction rate coefficient k1, and a higher amount of fractionation products obtained (i.e. a lower percentage of the feed material is degraded e.g. by esterification).

TABLE 2

Reaction estimation in different $2^{nd}$ depitching evaporators

| Compared unit | TFE | SPE |
|---|---|---|
| Fatty acids esterified in 2nd depitching stage (compared to initial feed to distillery) | 0.41% | 0.11% |

| Evaporator section | Top part | Bottom part | Top part | Bottom part |
|---|---|---|---|---|
| Reaction rate coefficient k1 (mol/minL) | 0.49 | 3.36 | 0.03 | 1.62 |
| Concentration of fatty acids (mol/L) | 0.86 | 0.06 | 0.86 | 0.02 |

TABLE 2-continued

Reaction estimation in different $2^{nd}$ depitching evaporators

| Compared unit | TFE | | SPE | |
|---|---|---|---|---|
| Concentration of sterols (mol/L) | 0.19 | 0.37 | 0.19 | 0.34 |

Example 3: The Effect of Short Path Depitching Effects on Rosin Column Design By utilizing SPE in depitching, the feed to the rosin column is partially liquefied. In comparison, with only TFE depitching the feed is completely in vapour phase unless separate condensers are used. With the feed being completely vaporized, larger vapour load is present in the top part of the rosin column. Therefore, rosin column design where the rectifying section is significantly wider than the stripping section, is required. According to the experience of the inventors, the top section is typically causing the majority of the pressure drop in the rosin column, which increases the bottom sump temperature of the rosin column. In other words, the rectifying section is typically too narrow.

With SPE depitching, the vapour load at the rectifying section is decreased. On the other hand, vapour load is increased at the stripping section due to slightly increased reboiler duty. The overall column design results in a much more equally distributed column, which also eases its manufacturing. This is especially welcomed for large rosin columns where the diameter of the rectifying section may exceed 4 m. A concern is that a wide column with structured or random packings may increase the risk for maldistribution and thus lower the number of theoretical stages in the column. This sets more stress for a robust liquid distributor design.

Table 3 presents a comparison between the above presented alternatives with an equal feed to the depitching unit. In addition to a more equally sized rosin column, the overall column and packing volume decreased as well. This transfers directly to savings in vessel and packing costs.

TABLE 3

Comparison of rosin column design with different $2^{nd}$ depitching evaporators
Rosin column design

| Compared Unit | With thin film evaporator depitching | With short path depitching |
|---|---|---|
| Column diameter (m) | Rectifying section: 2.4 Stripping section: 1.2 | Rectifying section: 2.2 Stripping section: 1.6 |
| Column volume (m³) | 82.4 | 75.6 |

It will be obvious to a person skilled in the art that, as the technology advances, the inventive concept can be implemented in various ways. The invention and its embodiments are not limited to the examples described above but may vary within the scope of the claims.

The invention claimed is:

1. A process for fractionating biomass-based material, wherein the process comprises:
   evaporating biomass-based material in a thin film evaporator thereby producing a thin film evaporator overhead vapour fraction containing at least organic acids and neutral organic components, and a thin film evaporator residue fraction;

evaporating said thin film evaporator residue fraction in a short path evaporator thereby producing a depitched lights fraction in liquid form, and a heavier pitch fraction; and distilling, in a distillation column, the thin film evaporator overhead vapour fraction, and the depitched lights fraction in liquid form, thereby producing a lighter organic acid and neutral organic components fraction, a first heavier organic acid and neutral organic components fraction in liquid form, and a second heavier organic acid and neutral organic components fraction in gaseous form;

wherein the thin film evaporator overhead vapour fraction contains at least rosin acid and fatty acid.

2. A process according to claim 1, wherein the process comprises:

obtaining as products said heavier pitch fraction, lighter organic acid and neutral organic components fraction, first heavier organic acid and neutral organic components fraction, and second heavier organic acid and neutral organic components fraction.

3. A process according to claim 2, wherein the thin film evaporator overhead vapour fraction is subjected to phase separation before the distillation in the distillation column, to remove liquid from the thin film evaporator overhead vapour fraction.

4. A process according to claim 2, wherein the process comprises:

dehydrating biomass-based material to remove water, light organic acids, light neutral organic components and evaporable organic and inorganic impurities, to produce dehydrated biomass-based material, and/or dehydrating crude tall oil to remove turpentine and water, to produce dehydrated crude tall oil;

wherein the dehydration is performed by evaporating at a temperature of 50-240° C. and at a pressure of 3-10 kPa.

5. A process according to claim 4, wherein the inorganic impurities include light sulphur compounds.

6. A process according to claim 2, wherein the process comprises:

treatment of at least one of said fractions by purification to remove impurities.

7. A process according to claim 1, wherein the biomass-based material is crude tall oil, and the depitched lights fraction in liquid form includes a depitched tall oil fraction in liquid form, and the heavier pitch fraction includes a tall oil pitch fraction, wherein crude tall oil is evaporated in the thin film evaporator to produce the thin film evaporator overhead vapour fraction containing at least rosin acid and fatty acid, and a crude tall oil fraction containing thin film evaporator residue;

wherein said depitched tall oil fraction in liquid form, and said tall oil pitch fraction are obtained by evaporating said crude tall oil fraction in said short path evaporator;

wherein the thin film evaporator overhead vapour fraction and the depitched tall oil fraction are distilled in the distillation column to produce a crude fatty acid fraction, a tall oil rosin fraction in liquid form, and a tall oil rosin fraction in gaseous form; and obtaining as products said tall oil pitch fraction, said crude fatty acid fraction and said tall oil rosin fraction.

8. A process according to claim 7, comprising:

subjecting the depitched lights fraction and/or the depitched tall oil fraction to distilling in the distillation column directly after the evaporation in the short path evaporator.

9. A process according to claim 7, wherein the lighter organic acid and neutral organic components fraction and/or the crude fatty acid fraction comprises at least one of:

about 3 wt-% to 8 wt-% rosin acid, or about 5 wt-% rosin acid.

10. A process according to claim 7, comprising:

recovering said heavier pitch fraction and/or said tall oil pitch fraction at a short path evaporator bottoms temperature of at least one of 240° C. to 320° C., or 260° C. to 300° C., or 270° C. to 290° C.

11. A process according to claim 7, wherein the process comprises:

redistilling, in a redistillation column, the first heavier organic acid and neutral organic components fraction and/or the tall oil rosin fraction in liquid form, to produce a further purified rosin fraction and a bottoms rosin fraction, wherein the redistillation is performed below a depitching temperature, and at the pressure of the distillation column or lower.

12. A process according to claim 7, wherein the process comprises:

distilling, in a light heads column, at least part of the crude fatty acid fraction and/or lighter organic acid and neutral organic components fraction, to produce a light heads fraction as a heads column distillate, and a further crude fatty acid fraction and/or a further lighter organic acid and neutral organic components fraction as a heads column bottom fraction;

distilling, in a fatty acid column, said further crude fatty acid fraction and/or a further lighter organic acid and neutral organic components fraction to produce a fatty acid fraction obtained as a fatty acid column distillate, and bottom oil obtained as a fatty acid column bottom fraction; and recovering the light heads fraction, the fatty acid fraction, and bottom oil;

wherein the operating pressure of the light heads column is the same or slightly higher compared to the distillation column operating pressure, and wherein the fatty acid column operating pressure is the same or slightly higher compared to the distillation column operating pressure.

13. A process according to claim 1, wherein the thin film evaporator is a wiped film evaporator or a falling film evaporator.

14. A process according to claim 1, wherein the distillation column is a packed column, a random packing column, structured packing column or tray column.

15. A process according to claim 1, comprising:

performing evaporation in the short path evaporator at a pressure of at least one of 1400 Pa or less, or at 100 Pa to 1000 Pa, or at 200 Pa to 700 Pa, or at 250 Pa to 400 Pa.

16. A process as claimed in claim 1, wherein the process comprises:

dehydrating crude tall oil to remove turpentine and water, to produce dehydrated crude tall oil; wherein the dehydrated crude tall oil is evaporated in the thin film evaporator to produce the thin film evaporator overhead vapour fraction containing at least rosin acid and fatty acid, and a crude tall oil fraction comprising thin film evaporator residue;

wherein the produced crude tall oil fraction is evaporated in the short path evaporator to produce a depitched tall oil fraction comprising depitched tall oil in liquid form, and a tall oil pitch fraction;

wherein the produced thin film evaporator overhead vapour fraction and depitched tall oil fraction are distilled in the distillation column to produce a crude fatty acid fraction comprising crude fatty acid, a fraction comprising tall oil rosin in liquid form, and a fraction comprising tall oil rosin in gaseous form;

wherein the process comprises recovering said tall oil pitch fraction, said crude fatty acid fraction and said tall oil rosin fraction;

redistilling, in a redistillation column, the tall oil rosin fraction comprising tall oil rosin in liquid form, to produce a further purified tall oil rosin fraction and a bottoms rosin fraction;

distilling, in a light heads column, at least part of the crude fatty acid fraction comprising crude fatty acid, to produce a light heads fraction as a heads column distillate, and a further crude fatty acid fraction as a heads column bottom fraction;

distilling, in a fatty acid column, the further crude fatty acid fraction to produce tall oil fatty acid fraction obtained as a fatty acid column distillate, and bottom oil obtained as a fatty acid column bottom fraction; and recovering the light heads fraction, tall oil fatty acid fraction, and bottom oil.

17. A process according to claim 16, wherein the operating pressure of the light heads column is the same or slightly higher compared to the distillation column operating pressure and the fatty acid column operating pressure is the same or slightly higher compared to the distillation column pressure, wherein the process comprises:

performing the dehydration by evaporating at a temperature of 50-240° C. and at a pressure of 3-10 kPa; and/or performing the redistillation below a short path evaporator depitching temperature, and at the pressure of the distillation column or lower.

18. A process according to claim 16, wherein the process comprises:

treatment of at least one of crude tall oil, the tall oil pitch fraction, and the crude fatty acid fraction by purification to remove impurities.

19. A process according to claim 16, wherein the process comprises:

subjecting the thin film evaporator overhead vapour fraction to phase separation before the distillation in the distillation column, to remove liquid from the thin film evaporator overhead vapour fraction.

20. A fractionation apparatus, wherein the apparatus comprises:

a thin film evaporator configured to evaporate biomass-based material, to produce a thin film evaporator overhead vapour fraction containing at least rosin acid and fatty acid, and a thin film evaporator residue fraction;

a short path evaporator configured to evaporate the thin film evaporator residue fraction to produce a depitched lights fraction in liquid form, and a heavier pitch fraction;

a distillation column configured to distillate the produced thin film evaporator overhead vapour fraction, and the depitched lights fraction in liquid form containing a depitched tall oil fraction in liquid form, to produce a crude fatty acid, CFA, fraction, a first rosin fraction in liquid form, and a second rosin fraction in gaseous form; and means for recovering said heavier pitch fraction, said crude fatty acid fraction, said first rosin fraction, and said second rosin fraction;

wherein the apparatus contains the thin film evaporator overhead vapour fraction containing at least rosin acid and fatty acid.

21. An apparatus as claimed in claim 20, wherein the thin film evaporator is a wiped film evaporator or a falling film evaporator.

22. An apparatus as claimed in claim 20, wherein the distillation column is a random packing column, structured packing column or tray column.

* * * * *